United States Patent [19]
Hall

[11] 4,156,463
[45] May 29, 1979

[54] VISCOUS OIL RECOVERY METHOD
[75] Inventor: Wilbur L. Hall, Bellaire, Tex.
[73] Assignee: Texaco Inc., White Plains, N.Y.
[21] Appl. No.: 918,872
[22] Filed: Jun. 26, 1978
[51] Int. Cl.² .......................... C10G 1/04; E21B 43/24
[52] U.S. Cl. ................................. 166/272; 208/11 LE
[58] Field of Search ................ 166/272, 303, 273–275; 252/8.55 D; 208/11 R, 11 LE

[56] References Cited
U.S. PATENT DOCUMENTS

| | | | |
|---|---|---|---|
| 3,051,644 | 8/1962 | Friedman et al. | 208/11 R |
| 3,221,813 | 12/1965 | Closmann et al. | 166/272 X |
| 3,347,313 | 10/1967 | Matthews et al. | 166/272 |
| 3,360,043 | 12/1967 | Braden, Jr. et al. | 166/272 |
| 3,913,671 | 10/1975 | Redford et al. | 166/272 X |
| 3,929,625 | 12/1975 | Lucas | 208/11 R X |
| 4,043,922 | 8/1977 | Palmer et al. | 166/272 X |

Primary Examiner—Stephen J. Novosad
Attorney, Agent, or Firm—Carl G. Ries; Thomas H. Whaley; Jack H. Park

[57] ABSTRACT

Disclosed is a thermal oil recovery method suitable for recovering viscous oil by injecting steam and an amine compound having the following formula:

$$R_1R_2NR_3$$

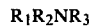

wherein $R_1$ and $R_2$ are each hydrogen or a $C_1$ to $C_6$ and preferably a $C_2$ to $C_4$ alkyl, linear or branched, and $R_3$ is an alkyl, linear or branched, having from 3 to 20 and preferably 4 to 12, or $R_3$ is $-R_4NH_2$ wherein $R_4$ is a $C_2$ to $C_{18}$ alkyl, linear or branched, and preferably 3 to 11, the sum of carbon atoms in $R_1$, $R_2$ and $R_3$ being from 3 to 20 and preferably from 7 to 13. The amine and steam may be mixed and injected into the formation, or one or more slugs of amine may be injected sequentially with steam injection. The amine improves the overall oil recovery and thermal efficiency of a steam flooding oil recovery process by improving the separation of viscous oil from the formation mineral surfaces.

15 Claims, No Drawings

VISCOUS OIL RECOVERY METHOD

FIELD OF THE INVENTION

This invention concerns an improved thermal oil recovery process for recovering viscous oil from subterranean deposits thereof. More particularly, this invention concerns a thermal oil recovery process involving injection of steam and an amine.

BACKGROUND OF THE INVENTION

There are many subterranean petroleum-containing formations from which petroleum cannot be recovered because the petroleum viscosity is so high that it will not flow or cannot be pumped to the surface of the earth without first applying a treatment which accomplishes a reduction in the petroleum viscosity. The most extreme example of viscous petroleum-containing formations are the so-called tar sand or bituminous sand deposits. The largest and most famous deposit of tar sand is the Athabasca tar sand deposit located in the northeastern part of the province of Alberta, Canada. Although this deposit contains in excess of 700 billion barrels of petroleum, essentially no recovery of petroleum has been affected by commercial means from these deposits because of the very high viscosity of the oil contained therein. Other viscous oil formations are found in the United States and in various other countries throughout the world.

Thermal recovery techniques have been used successfully for recovering viscous petroleum from subterranean formations in many applications, although they have been unsuccessful on a commercial basis in other deposits for a variety of reasons. The most successful thermal recovery technique involves introducing steam into the formation to raise the temperature of the viscous petroleum, thereby decreasing its viscosity sufficiently that it will flow or can be displaced to a well, which may be the same well as was used for steam injection or a spaced-apart production well, from which it can be pumped to the surface of the earth. Although most viscous oil formations can be stimulated to produce some oil by steam injection, the cost effectiveness is such that steam flooding can be applied to viscous oil formations on a profitable basis in only a limited number of instances. The principal cost factor in steam flooding operations is the cost of fuel required to generate the steam for injecting into the formation. Obviously, the amount of oil recovered per unit of fuel required to generate steam used in the recovery of oil is a critical factor, and is the principal reason that many viscous oil formations cannot be successfully exploited by steam stimulated recovery.

Various additives have been proposed in the prior art for improving the effectiveness of steam flooding oil recovery processes. Various solvents have been injected or mixed with steam, and generally result in some improvement in the oil recovery, although it has often been found that the amount of additional oil recovered is not sufficient to justify the cost of the solvents introduced into the formation in combination with steam. The use of liquid, gaseous, and combinations of liquid and gaseous hydrocarbon solvents with steam are disclosed in many prior art references.

PRIOR ART

U.S. Pat. No. 3,822,749 discloses the use of a pretreatment comprising a gaseous phase aliphatic polyamine injected into a formation containing water sensitive clays prior to injecting steam thereinto, the polyamine being utilized to reduce the water sensitivity of water sensitive clays.

SUMMARY OF THE INVENTION

In its broadest aspect, the present invention comprises a combination of steam injection with injection of an amine solvent the amine having the following formula:

$$R_1R_2NR_3$$

wherein $R_1$ and $R_2$ are each hydrogen or a $C_1$ to $C_6$ and preferably a $C_2$ to $C_4$ alkyl, linear or branched, $R_3$ is a $C_3$ to $C_{20}$ and preferably $C_4$ to $C_{12}$ alkyl, linear or branched, or $-R_4NH_2$ wherein $R_4$ is 2 to 18 and preferably 3 to 11 alkyl, linear or branched, and the sum of the number of carbon atoms in $R_1$, $R_2$ and $R_3$ is from 3 to 20 and preferably 7 to 13. The above noted amine may be introduced into the formation by mixing the amine with steam and injecting it into the formation, or the amine may be introduced separately in the form of one or more slugs of amine followed by steam to accomplish mixing in the formation. From 0.1 to 30 and preferably from 2 to 10 pore volume percent of amine should be utilized in applying this process to a viscous oil formation. The amount of amine utilized should be nearer the upper end of the preferred range in applications to formations containing very viscous petroleum, i.e., the amount of amine required increases roughly in proportion to the viscosity of petroleum present in the formation. The amine effectively reduces the attraction between the viscous oil and surface of the sand grains or other formation mineral matrix, thereby greatly increasing the amount of oil recovered from the zone through which the steam passes.

DESCRIPTION OF THE PREFERRED EMBODIMENTS

In its broadest embodiment, the present invention concerns an improved thermal oil recovery method employing introducing steam into the formation for the purpose of heating viscous oil contained therein, thereby reducing the viscosity of the oil so it may be displaced to a well from which it can be recovered to the surface of the earth. Conventional steam flooding is applied commercially in two somewhat different ways, one being a steam drive process in which steam is injected into the formation by one or more injection wells to pass through the formation, displacing and mobilizing petroleum, the petroleum being displaced to a spaced-apart production well from which it can be recovered to the surface of the earth. The other commonly used method is steam push-pull of huff-and-puff method, in which steam is injected into a formation, allowed to remain in the formation for a period of time sufficient to transfer thermal energy to the viscous petroleum, and then fluids including petroleum are recovered from the formation by the same well as was used for introduction of steam into the formation. Both methods are successful for recovering viscous oil, to varying degrees depending on the viscosity of the oil, the attractive forces between the oil and the formation mineral surfaces as well as many other factors.

Steam drive is the preferred method in most applications since it achieves oil recovery at greater distances from the wells and its thermal efficiency is greater than push-pull steam methods.

In applying the process of my invention to a subterranean, viscous oil-containing formation, the preferred method comprises introducing the steam and amine into the formation by one or more injection wells, and recovering oil mobilized and displaced by the steam and amine from the formation from one or more production wells which are spaced apart from the injection wells. This involves the commonly known steam-drive oil recovery process, and effects recovery at much greater depths in the formation from the well than is possible with the push-pull steam flooding method.

In applying the process of my invention, either saturated of superheated steam may be utilized. The most practical method involves the use of saturated steam, and the preferred steam quality ranges from 20 to 100 and preferably from 60 to 80 percent.

The amine utilized in the process of my invention has the following formula:

$$R_1R_2NR_3$$

wherein $R_1$ and $R_2$ are each hydrogen or a $C_1$ to $C_6$ and preferably a $C_2$ to $C_4$ alkyl, linear or branched, $R_3$ is a $C_3$ to $C_{20}$ and preferably $C_4$ to $C_{12}$ alkyl or $R_3$ is —$R_4NH_2$ wherein $R_4$ is 2 to 18 and preferably 3 to 11, and the sum of the number of carbon atoms in $R_1$, $R_2$ and $R_3$ is from 3 to 20 and preferably 7 to 13.

One example of a material which is within the scope of the above formula which has been tested and found to effectively dislodge viscous petroleum from sand grains is diethylaminopropylamine $(C_2H_5)_2NC_3H_6NH_2$. This material is a water white substance with a typical amine odor, having a boiling point of 159° C. and a freezing point of −100° C. The specific gravity is 0.82 (20/20° C.) and a flash point of 145° C. It is known for use as a curing agent for epoxy resins and as a chemical intermediate for other manufacturing and processes.

Another example of a preferred amine within the above formula which has been examined and found to greatly improve the oil recovery effectiveness of steam flooding is a $C_{10}$-$C_{13}$ sec alkyl primary amine. This compound is available commercially from Texaco Petrochemical Sales under the designation PT-9108 and has a boiling point of 259° C., and is only slightly soluble in water.

If it is desired to mix the amine described above with steam, then the concentration of amine should be from 0.5 to 25 and preferably from 2 to 10 percent by weight. The steam and amine mixture may be injected into the formation in the early phase of the steam flooding operation, until the total amount of amine introduced into the formation is in the range of from about 0.1 to about 30 and preferably 2 to 10 pore volume percent based on the pore volume of the recovery zone being treated. After this amount of amine has been injected, steam (without amine) may be injected for a period of time sufficient to displace the previously injected fluids as well as mobilize oil through the formation. It is more efficient to introduce the amine into the formation during the early stages of steam injection, rather than injecting steam for any prolonged period of time and then inject amine mixed with or sequentially with additional steam.

Another method of applying the process of my invention involves injecting one or more discrete slugs of the amine into the formation, before or interspersed with periods of injecting essentially pure steam into the formation. Since some of the preferred species are only slightly soluble in water, this is an effective means of accomplishing intimate contact between the amine and steam with a viscous petroleum present in the formation.

FIELD EXAMPLE

A pilot field project is undertaken utilizing an inverted five-spot pattern with one injection well in the center of a square grid and a producing well on each of the four corners of the square. The distance of each side of the square is 200 feet. The wells are completed in a viscous oil formation containing 11° API crude, which is too viscous to flow or be displaced by ordinary primary or secondary recovery techniques. The porosity is 39 percent and the permeability is 1200 millidarcies. The oil saturation is 61 percent. The formation thickness is 45 feet.

The total pore volume of each grid unit is $0.39 \times 200 \times 200 \times 45 = 702,000$ cubic feet (19,880 cubic meters). Since the horizontal sweep efficiency of such a pattern is 70 percent and the vertical conformance is 60 percent, only 42 percent or 294,840 cubic feet (8350 cubic meters) will be contacted by steam. The process applied to this pilot involves the use of a 5 percent pore volume treatment of a dodecyl amine. Five percent amounts to 14,740 cubic feet or 110,285 gallons, which requires about ¾ of a million pounds of the dodecyl primary amine.

In applying the process, 80 percent quality steam is injected into the injection well for two days to preheat the portions of the formation immediately around the injection well, to facilitate injection of the amine into the formation. The total amine treatment is applied in four discrete slugs, each involving injecting 190,000 pounds of amine into the formation followed by injection of steam for 60 days. Steam and amine comingle in the formation with one another and with the formation petroleum, effecting viscosity reduction of the petroleum and also effectively reducing the retentive forces between the viscous petroleum and the formation sand grains. After the last treatment of amine is completed, steam injection is continued in the formation until a total of two pore volumes of steam (based as water) have been injected into the formation. This requires approximately 90 weeks of injection. As a result of the above described process, the residual oil saturation is reduced from 61 percent to 12 percent, within the zone contacted by the injected fluids, which is considered as excellent for this particular reservoir.

EXPERIMENTAL SECTION

Laboratory tests were conducted utilizing samples of tar sand material. The samples were mixed at room temperature with diethylaminopropylamine as a solvent, and it was observed that under static conditions at ambient temperature, essentially all of the viscous tar sand materials were dislodged and removed from the mineral surfaces of the tar sand sample, thus indicating the effectiveness of this material for removing viscous petroleum from sand grains. Tar sand materials are bituminous in character and there is a great affinity between the hydrocarbon portion and the sand grains which is a major cause of the great difficulty that has been encountered in obtaining recovery of petroleum from tar sand deposits. Accordingly, the above-described observation is quite significant for application to bituminous, viscous petroleum formation as well as other viscous oil formations.

A series of displacement tests were conducted in small, seven-inch cells which were packed with 10.5° API crude oil, sand and water to give an initial oil saturation of about 0.55 and a permeability of about 0.36 darcies. The first cell was steam flooded at a 120 gram per hour steam rate at an injection pressure of 240 PSI while maintaining 200 PSI backpressure. The second cell was treated first with 10 percent pore volume amine additive prior to injecting the same quality steam at the same steam injection rate. The amine used in this test was a $C_{10}$-$C_{13}$ (secondary alkyl) primary amine available commercially from Texaco Petrochemicals Department under the designation PT-9108. All of the amine was injected in a single 10 percent pore volume slug prior to injecting steam into the core. The first steam flood succeeded in reducing the oil saturation to 0.195 which is equivalent to 63.6 percent recovery. In the second flood, employing the amine in accordance with the process of my invention, the oil saturation was reduced from the same 0.55 initial level to 0.051, for 90.7 percent recovery, which is 40 percent greater than the base steam run. This is considered to be an excellent recovery for such viscous crude, and readily illustrates the effectiveness of the process of my invention for recovering viscous petroleum.

To illustrate the comparative effectiveness of the steam amine oil recovery method of my invention, the following is a tabulation of the residual oil saturation of laboratory steam displacement tests with steam or mixtures of steam and various additives.

TABLE I

| Oil Recovery Fluid | Residual Oil Saturation |
|---|---|
| Steam alone (average of several runs) | 25 % |
| Steam plus ethanol | 24.4 % |
| Steam plus carbon dioxide | 21.6 % |
| Steam plus propane and ethanol | 19.4 % |
| Steam plus condensate | 17.4 % |
| Steam plus t-butyl alcohol + pentane | 17.0 % |
| Steam plus BZ Raffinate | 16.4 % |
| Steam plus aromatic solvent | 16.2 % |
| Steam plus heavy CR gasoline | 14.0 % |
| Steam plus benzene | 13.0 % |
| Steam plus light SR gasoline | 11.1 % |
| Steam plus Udex Extract | 9.3 % |
| Steam plus Amine | 5.1 % |

The above data clearly indicates the surprising superiority of the use of steam plus amine as compared to steam or mixtures of steam and other additives.

Thus I have disclosed and demonstrated how the amount of oil recovered from viscous oil formations by steam flooding is greatly increased by contacting the viscous oil with one of the above-described amines prior to or simultaneously with steam injection. While my invention has been described in terms of several illustrative embodiments, it is not my intention that my invention be so limited since many variations thereover will be apparent to persons skilled in the art of viscous oil recovery methods without departing from the true spirit and scope of my invention. It is my desire and intention that my invention be limited only by those restrictions and limitations appearing in the claims appended immediately hereinafter below.

I claim:

1. A method of recovering viscous petroleum from a subterranean, permeable, viscous petroleum-containing formation penetrated by at least one well comprising:
   a. introducing an amine of the following formula:

$$R_1R_2NR_3$$

wherein $R_1$ and $R_2$ are each hydrogen or a $C_1$ to $C_6$ alkyl, linear or branched, $R_3$ is a $C_3$ to $C_{20}$ alkyl, linear or branched, or —$R_4NH_2$ wherein $R_4$ is a $C_2$ to $C_{18}$ alkyl, linear or branched, and the sum of the number of carbon atoms in $R_1$, $R_2$ and $R_3$ is from 3 to 20, and a thermal oil recovery fluid comprising steam into the formation to contact viscous petroleum, thereby increasing the mobility of the viscous petroleum, and reducing the attraction between the viscous petroleum and the formation mineral surface, and
   b. recovering the petroleum from the formation.

2. A method as recited in claim 1 wherein the formation is penetrated by at least one injection well and by at least one production well, and the steam and amine are injected into the formation by means of the injection well to mobilize and displace petroleum through the formation to the production well from which it is recovered to the surface of the earth.

3. A method as recited in claim 1 wherein $R_1$ is a $C_2$ to $C_4$ alkyl.

4. A method as recited in claim 1 wherein $R_2$ is a $C_2$ to $C_4$ alkyl.

5. A method as recited in claim 1 wherein $R_3$ is a $C_4$ to $C_{12}$ alkyl.

6. A method as recited in claim 1 wherein $R_3$ is a compound of the formula $R_4NH_2$ wherein $R_4$ is $C_3$ to $C_{11}$.

7. A method as recited in claim 1 wherein the amine is a diethylaminopropylamine.

8. A method as recited in claim 1 wherein the amine is a $C_{10}$ to $C_{13}$ alkyl primary amine.

9. A method as recited in claim 1 wherein the amine is introduced into the formation in one or more slugs followed by injection of essentially pure steam into the formation.

10. A method as recited in claim 1 wherein the amine is comingled with steam, with the concentration of amine being from 0.5 to 25 percent by weight.

11. A method as recited in claim 10 wherein the concentration of amine is from 2 to 10 percent by weight.

12. A method as recited in claim 1 wherein the total amount of amine introduced into the formation is from 0.1 to 30 percent of the pore volume of the formation.

13. A method as recited in claim 12 wherein the percent of amine introduced into the formation is from 2 to 10 percent of the total pore volume of the formation.

14. A method as recited in claim 1 wherein the amine is introduced into the formation in the form of a mixture of amine and steam with the amine concentration being from 0.5 to 25 percent by weight of the steam in the mixture until the total amount of steam introduced into the formation is from 0.1 to 30 percent of the pore volume of the portion of the formation being contacted by steam-amine mixture, after which essentially pure steam is introduced into the formation.

15. A method of separating viscous petroleum from petroleum formation mineral surfaces comprising contacting the petroleum and minerals with steam and an amine having the following formula $R_1R_2NR_3$ wherein $R_1$ and $R_2$ are each hydrogen or an alkyl, linear or branched having from 1 to 6 carbon atoms, and $R_3$ is an alkyl, linear or branched, having from 3 to 20 carbon atoms, or a compound having the formula $R_4NH_2$ wherein $R_4$ is an alkyl, linear or branched, having from 2 to 18 carbon atoms, and the total number of carbon atoms in $R_1$, $R_2$ and $R_3$ is from 3 to 20.

* * * * *